United States Patent
Ray

(10) Patent No.: US 8,805,858 B1
(45) Date of Patent: Aug. 12, 2014

(54) METHODS AND SYSTEMS FOR SPATIAL FILTERING USING A STOCHASTIC SPARSE TREE GRID

(75) Inventor: Gary Alan Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/285,677

(22) Filed: Oct. 31, 2011

(51) Int. Cl.
*G06F 7/00* (2006.01)

(52) U.S. Cl.
USPC .......................................... 707/754

(58) Field of Classification Search
USPC .......................................... 707/754
See application file for complete search history.

(56) References Cited

U.S. PATENT DOCUMENTS

| | | | |
|---|---|---|---|
| 2003/0095716 A1* | 5/2003 | Gindele et al. | 382/260 |
| 2005/0083849 A1* | 4/2005 | Rui et al. | 370/252 |

OTHER PUBLICATIONS

Aspnäs, M. et al.; Efficient Assembly of Sparse Matrices Using Hashing; PARA 2006; LCNS 4699; pp. 900-907; © Springer-Verlag Berlin Heidelberg 2007.
Ekambaram, A. et al.; An Alternative Compress Storage Format for Sparse Matrices; ISCIS 2003; LNCS 2869; pp. 196-203; © Springer-Verlag Berlin Heidelberg 2003.
Dongarra, J.; Sparse Matrix Storage Formats; http://web.eecs.utk.edu/~dongarra/etemplates; 8 pages; Nov. 20, 2000.
Saad, Y.; Sparskit: A Basic Tool Kit for Sparse Matrix Computations; pp. 1-36; Jun. 6, 1994.

* cited by examiner

*Primary Examiner* — Truong Vo
(74) *Attorney, Agent, or Firm* — Armstrong Teasdale LLP

(57) ABSTRACT

A computer-based method for processing data is described. The method includes receiving, at a processing device, data to be processed, processing the data to assign spatial information to the data, the spatial information defining an element on a grid, determining, with the processing device, a sparseness of the processed data through application of the processed data to a multiple resolution level sparse tree filter, placing the processed data within a histogram based on the determined sparseness, and filtering the data based on spatial statistics using a sparse histogram method.

20 Claims, 12 Drawing Sheets

Two close reports in different grid cells

METHODS AND SYSTEMS FOR SPATIAL FILTERING USING A STOCHASTIC SPARSE TREE GRID

BACKGROUND

The field of the disclosure relates generally to data filtering, and more specifically, to methods and systems for spatial filtering using a stochastic sparse tree grid.

One problem with existing data filtration solutions is that such solutions cannot manage extremely large sets of data where the signals of interest lie within a large set of unimportant data. This problem is sometimes referred to as a noise and interference cancellation problem. More specifically, existing data filtration solutions to the noise and interference cancellation problem for wide area sensors must simplify their processing when trying to spatially match information from frame to frame due to, in the two dimensional case, the $O(N^2M^2)$ complexity of matching location information across an N×M grid. This simplification in processing results in an artificial reduction of N, M or a reduction in matching with other information from all parts of the grid. Currently, the only way to overcome this computational problem is to increase the computational resources associated with the sensor beyond what would be practical to have within such sensor systems.

BRIEF DESCRIPTION

In one aspect, a computer-based method for processing data is provided that includes receiving, at a processing device, data to be processed, processing the data to assign spatial information to the data, the spatial information defining an element on a grid, determining, with the processing device, a sparseness of the processed data through application of the processed data to a multiple resolution level sparse tree filter, placing the processed data within a histogram based on the determined sparseness, and filtering the data based on spatial statistics using a sparse histogram method.

In another aspect, a system for filtering of data is provided that includes a plurality of sensors configured to generate data representative of a physical spatial domain, a memory for storing the data, and a processor coupled to the memory and the sensors. The processor is programmed to receive the data from the physical spatial domain, process the data to assign spatial information to the data, the spatial information defining an element on a grid, determine a sparseness of the processed data through application of the processed radar return data to a multiple level, stochastic sparse tree grid spatial filter, place the processed data within a histogram based on the determined sparseness, and filter the data based on spatial statistics using a sparse histogram method.

In still another aspect, one or more computer-readable storage media having computer-executable instructions embodied thereon are provided. When executed by at least one processor, the computer-executable instructions cause the at least one processor to receive data from a physical spatial domain, process the data to assign spatial information to the data, the spatial information defining an element on a grid, determine a sparseness of the processed data through application of the processed data to a multiple level, stochastic sparse tree grid spatial filter, place the processed data within a histogram based on the determined sparseness, and filter the data based on spatial statistics using a sparse histogram method.

The features, functions, and advantages that have been discussed can be achieved independently in various embodiments or may be combined in yet other embodiments further details of which can be seen with reference to the following description and drawings.

DETAILED DESCRIPTION

Figure 1:
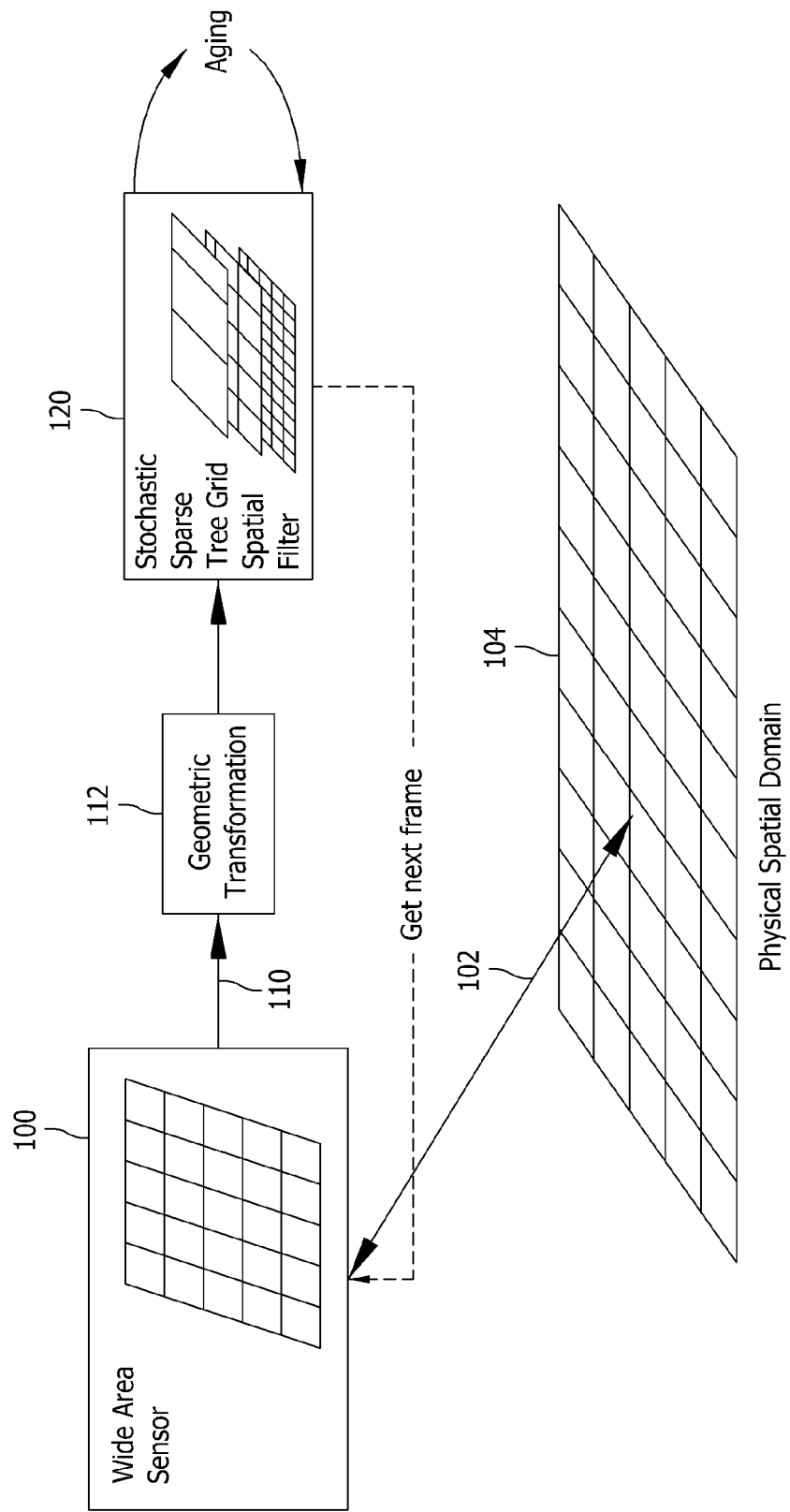
FIG. 1 depicts a stochastic sparse tree grid spatial filter in a wide area sensor application.

The described embodiments are directed to a spatial filter and filtering method for wide area surveillance sensors of all types. In particular, the embodiments relate to the use of a new mathematical construct, called a stochastic sparse tree grid, to implement a very powerful spatial filter using both efficient statistical and computer science data structures which can be used in a wide variety of applications. The embodiments disclosed herein are directed to a specific application, namely for use as a clutter filter for a wide area Doppler radar. However, it should be understood that the embodiments are not limited to the described application, and could also include optical imaging sensors in other example embodiments.

The described embodiments allow for better reception and classification of signals with spatial content coming from a wide area sensor. In particular, the embodiments provide better separation of signal from noise and interference when the number of signals of interest is large and spatial content is important in the classification task. To accomplish this separation, spatial information is used in a very general way to provide filtering across immense grids of data without the attendant computational load that would be necessary.

In particular, implantation of the stochastic sparse tree grid provides a higher probability of detection of weak signals within spatially defined noise and interfering signals, and a higher probability of correct classification through improved statistical methods applied to spatial information. The resulting benefits include longer range detection and classification, detection and classification involving smaller antenna/aperture, and detection and classification using lower transmit power. Such embodiments are applied to ESM (electronic support measures) radar, ELINT (electronic intelligence) radar, EW (electronic warfare) radar, EO/IR (electro-optic/infrared) imaging, and receiver providers in the military arena. In the commercial arena, the embodiments apply to navigation and air traffic radar as well as commercial environmental satellite imaging applications.

In one embodiment, technical effects of the methods, systems, and computer-readable media described herein include at least one of: (a) receiving data to be processed, (b) processing the data to assign spatial information to the data, the spatial information defining an element on a grid portion, (c) determining a sparseness of the processed data through application of the processed data to a multiple resolution level sparse tree filter, and (d) placing the processed data within a histogram based on the determined sparseness.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The embodiments described herein are direct, in least in part, to the use of a new mathematical construct, called a stochastic sparse tree grid, to implement a very powerful spatial filter. The next several paragraphs describe this construct, and the succeeding sections describe the particulars of using the stochastic sparse tree grid in a specific application as a clutter filter for a wide area Doppler radar. There are, however, many other applications for the spatial filter described in this disclosure.

The ordinary definition of a spatial filter is that of an optical device which alters the structure of a beam of coherent light or other electromagnetic radiation to "clean up" the output of lasers to removing imperfections in the beam or in the optics to produce a better image. Herein, the term "spatial filter" is used in the much more general context of filtering a signal with spatial content to remove noise or interference or for signal enhancement. The signal might be a visible image or video of a region, a synthetic aperture radar (SAR) image formed from radar returns, or the collection of Doppler radar returns across a physical extent, to give three specific examples.

A spatial filter uses signal "location" within the field of a sensor as one of its filter criteria. FIG. 1 illustrates how a stochastic sparse tree grid spatial filter fits into a wide area sensor application. A wide area sensor 100 receives signal reflections 102 from a physical spatial domain 104. Frames of sensor data 110 undergo a geometric transformation 112 and the transformed sensor data 114 are applied to the stochastic sparse tree grid spatial filter 120 for placement into a histogram and processing in succession with old input aging out of the grid so that the results can adapt over time to changing conditions.

Such a configuration allows for a method of mapping spatial sensor input into a sparse stochastic tree grid spatial filter, a method to handle a priori spatial information by embedding this information in the stochastic processing of each grid element, a method of efficiently implementing sparse stochastic histograms, and a method of efficiently accessing grid elements through a grid structure.

In particular, the next section covers the mathematical description of the stochastic sparse tree grid and following sections describe how this construct is used in a specific example as a clutter filter for a Doppler radar application.

The key mathematical innovations that allow for a stochastic sparse tree grid spatial filter include a grid-based method to implement a generalized spatial filter, a hash-based method to implement each filter level of a sparse gridded stochastic histogram, a tree-based method to implement an efficient search strategy within a sparse gridded stochastic histogram, and a specific mapping of the stochastic sparse tree grid spatial filter to implement an efficient, powerful Doppler radar clutter filter based on a-priori and a-posteriori information.

Sparse Tree Grid and its Implementation

Herein, a grid (represented mathematically by an array or matrix) is used to represent the spatial information from the sensor. A particular measurement is then associated with a particular grid (and therefore filter) element. The dimensionality of the problem is reflected in the dimensionality of the grid or matrix. For example, a planar or region on the earth's surface would be represented by a two dimensional grid, while a volumetric spatial filter would be represented by a three dimensional grid (laser radar is an example of an application that could use a 3D representation). The two dimensional case is primarily described since that is by far the most common.

For example, a pixel of visible image data is associated with a grid element within the pixelized two dimensional matrix/array of the entire image. If the sensor is moving, then some type of registration or tracking must occur so that the locations of sensor data are transformed so that they become associated with a stationary grid (corresponding to the ground, for example). Thus, in this example, a sensor pixel must be transformed into the grid representing spatial content fixed with reference to the earth.

The problem in the past with the representation described above is that this grid must be enormous to cover large areas representing the field of view (FOV) of the sensor. This FOV might encompass hundreds of miles in diameter with individual grids of size proportional to the resolution of the sensor. Furthermore, multigigabit pixel sensors have become the new standard for imaging sensors, causing finer resolution and further exacerbating the problem. But the ultimate problem is much bigger than that. For example, a 1000 km per side area with 1 m sensor resolution such as with ultra wide band radar would require a 1000 billion grid elements. Thus to deal with these large numbers of elements, a system and methodology must be created to have a sparsely occupied grid (since the number of objects of interest and hence number of occupied grid elements is far, far smaller).

The sparse matrix representation utilized herein is a coordinate format where the non-zero elements are stored in a hash table to allow for an efficient method to update individual elements in random order. Other methods are often used for sparse matrix storage since in many applications efficient matrix operations are the primary goal of the representation. However, the application herein described has no need for matrix operations, but rather requires efficient random access.

In the one embodiment, a general sparse array or table is implemented with hash key indexing. An element (x, y) in a two-dimensional sparse matrix with r rows and c columns and x in the interval [0, r−1] and y in the interval [0, c−1], with value v is stored in a hash table with the key k=x*c+y. The hash function h(k) is then given by h(k)≡k mod s. The size of the hash table s, is typically chosen to be a prime number greater than or equal to $n_z/b$, where $n_z$ is the number of non-zeros in the sparse matrix and b is a small integer value, for example, around 20). A different approach is disclosed herein, outlined below. The number of non-zero elements in the sparse matrix $n_z$ depends greatly on the domain used for the spatial filter and is dependent on the expected number of signals of interest. The basic idea of this hash code (or any hash code) is that on average b elements are mapped to any hash key and b is kept reasonably small so that an entry can be quickly located after matching the hash key.

Also, encoding the (x, y) coordinates of non-zero matrix elements as a single integer value k=x*c+y saves using two integer values, but also limits the size of the address space. However, with 64 bit integers and a square grid, this still allows grids with each dimension as large as $2^{32}−1$, over 4 billion rows and columns, which is usually sufficient.

There are four basic operation of a hash table: initialization, get, insert, and delete. At initialization, storage must be allocated. One source suggests initializing each key area (all values associated with a specific key) to entry size $n_z/s$, the average number of non-zero elements per hash key. When new non-zero values are inserted into a sparse array, there will be key areas which grow beyond this size and memory reallocation will need to be done.

A get operation computes its key k and the hash key h(k) from the (x, y) location as described earlier. The hash key is used as an address to look up the hash key location within the sparse array which contains a number of keys. A linear search is then used to search this for the key k. If the key is found, its value v is returned, otherwise the NULL value is returned.

An insert operation proceeds as the get operation by first computing its key k and hash key h(k) and then addressing the table and doing a linear search for the key. If the key is found, the value is added to the existing data (for example, involving a stochastic histogram operation to be defined elsewhere). If the key is not found and there is space for the new element in the array, it is inserted. Otherwise the array is enlarged by calling a realloc( ) function and the size of the array is updated. The value (k, v) is inserted into the next free position in the array and the number of elements in the array is incremented by one. This realloc( ) is an expensive operation and so it is normal to add memory based on existing size rather than just adding the amount needed at the moment. For example, 10% of the current key area size could be added each time more memory is needed.

Finally, a delete operation zeros or nulls a location within the sparse array. It proceeds as the get operation by first computing its key k and hash key h(k) and then addressing the table and doing a linear search for the key. If the key is found, the hash key entry is made available, and the number of elements in the array is decremented by one. If the key is not found, nothing is done.

The above description is how a standard sparse array would be accessed using hash keys, which is not sufficient for a wide area sensor application in which the ability to efficiently process billions of grids of sensor data that range from being extremely sparse to extremely dense is needed. An approach described herein uses a tree grid to create multiple levels of sparse arrays. The description above illustrates operation of one level of a stochastic sparse tree grid signifying sparse tree filter elements. As further described, the multiple level tree grid is used to increase the efficiency of this approach.

Sparse Tree Grid

Figure 2:
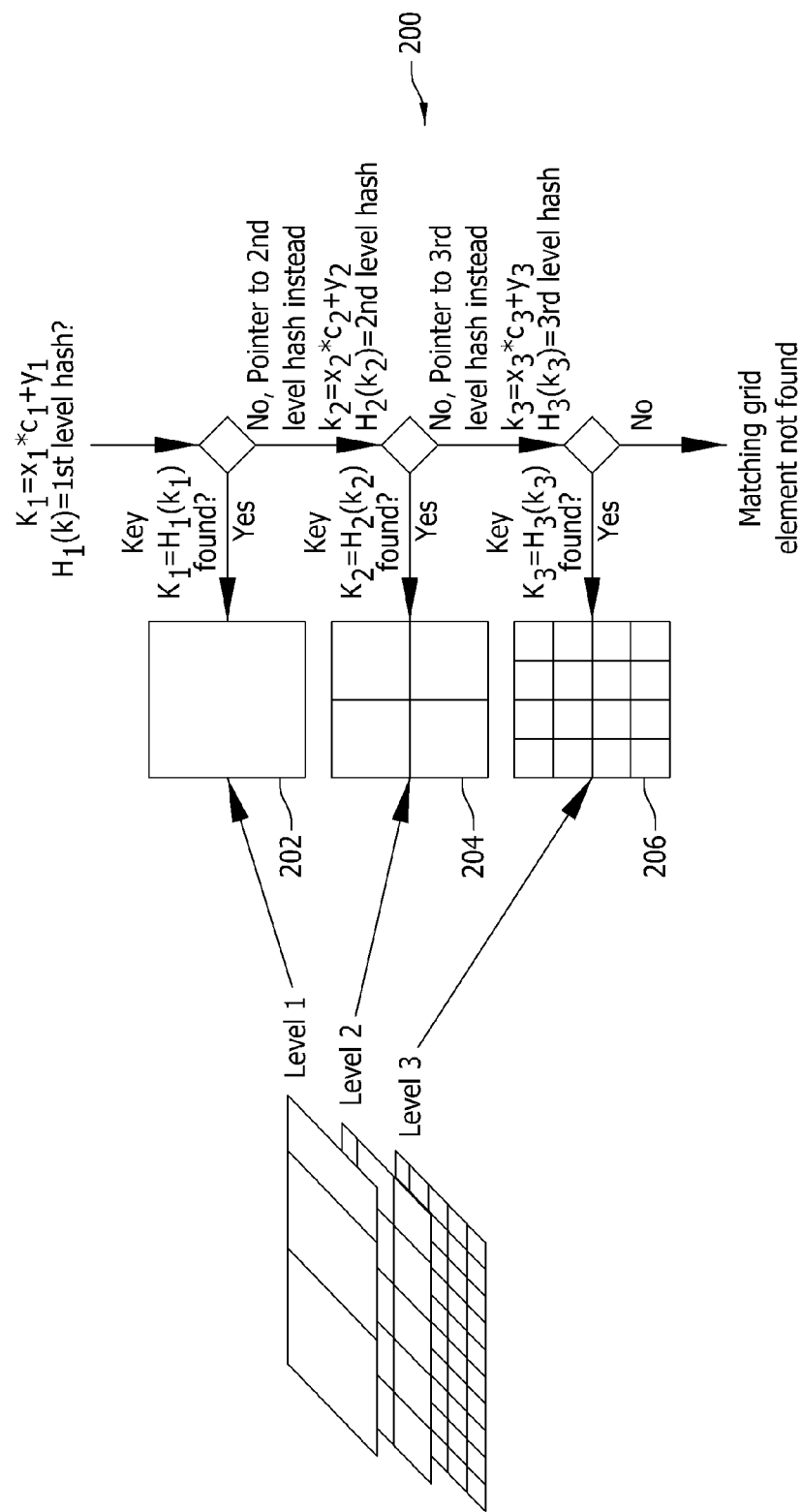
FIG. 2 illustrates a tree of grids that form a spatial filter.

The main problem with using a single grid to store all signal information to form a spatial filter is that most spatial information is very irregular. Some regions are dense and some are very sparse. This irregularity causes a hash table much inefficiency since there is an assumption that the number of keys within a single hash is relatively constant across the entire array. Since a hash causes some randomness in access, the hash helps with this problem, but nevertheless there are typically large areas with very little data (and correspondingly other areas with much non-zero data, which causes the linear search to increase in time as more items are added to the grid. The solution to this problem used herein is to use a tree of grids, as shown in FIG. 2.

A tree grid 200 or tree of grids is a series of grids, for example, 202, 204, 206 arranged in a multi-resolution fashion where the coarsest grid (first level) 202 is on top and is first to be accessed, while the finest grid 206 is on the bottom and would be last to be accessed. Particularly, a first hash key $h_1(k_1)$ is computed for the first level grid access and the coarsest grid 202 is accessed using this hash key. Either there will be a list of hash keys associated to this address, or there will be a pointer to another second level hash table, thereby defining a multiple level hash table. In the first case, operation will proceed as normal. In the second case, a new hash key $h_2(k_2)$ will be computed based on the hash for the new table and the operation repeated. This can continue as many grid levels as desired, thereby generating a number of hash keys, but only a few levels would be practical. Note that even though the approach described herein is described as a series of grids, one grid per level, the embodiments also contemplate multiple different grid portions, sometimes referred to as grid level portions, per each additional resolution level, each one supporting a denser spatial region than the grid above.

The advantages to the above described approach are clear. Small hash keys can be used for sparse areas of the area, while larger hash keys can be used for larger areas. One disadvantage is that lookups into denser regions would require more than one hash key construction. For example, an element location $(x_1, y_1)$ in a two-dimensional sparse matrix with $r_1$ rows and $c_1$ columns and $x_1$ in the interval $[0, r_1−1]$ and $y_1$ in the interval $[0, c_1−1]$, with value v will be stored in a hash table with the key $k_1=x_1*c_1+y_1$. The hash function $h_1(k)$ for level 1 is then given by $h_1(k_1) \equiv k_1 \bmod s_1$. In general, the hash function $h_m(k)$ for level m is given by $h_m(k_m) \equiv k_m \bmod s_m$, where $x_m$ is in the interval $[0, r_m−1]$ and $y_m$ is in the interval $[0, c_m−1]$ with $k_m=x_m*c_m+y_m$. The size of each hash table level $s_m$ would normally be chosen to be a prime number greater than or equal to $n_{z,m}/b$, where $n_{z,m}$ is the number of non-zeros in the sparse matrix at this level and b is a small integer value, for example, around 20. So only one key is computed and a different modulo operation is done at each level on the key computed for that level. A modification to this approach however is described herein.

Specifically, one further modification to the hash key generation for the multilevel hash table is proposed. Since the number of rows and columns in each level $r_m$, $c_m$ (or in general the number of discrete addresses for each dimension and each subgrid) is usually somewhat flexible for a large spatial filter such as considered herein; it does not have to be a power of two. The multilevel hash table can be configured to have a chosen (for example prime) number of rows and columns which allows the size of each hash key to be a power of two and still get the randomization required. In general the choice of number of rows r (and columns) must simply give good pseudo-random properties for the sequence $\{nr \bmod 2^e\}$, n=1, 2, . . . , therefore, the modulo operation or computation only requires ANDing the hash keys with a bit mask which masks the higher order bits, leaving what is equivalent to a modulo result without a division.

Specifically, given an element $(x_m, y_m)$ in a two-dimensional sparse matrix or subgrid with $r_m$ rows and $c_m$ columns and $x_m$ in the interval $[0, r_m-1]$ and $y_m$ in the interval $[0, c_m-1]$ where $r_m$ and $c_m$ are chosen numbers with good pseudo random properties with the key $k_m = x_m * c_m + y_m$, the hash function $h_m(k)$ for level m is given by $h_m(k) = (k) \& (2^{e_m}-1)$ where $s_m = 2^{e_m}$ and $\&$ is the bit and function. This provides a randomizing hash without using an integer division and so is more efficient than the previous approach.

Figure 3:
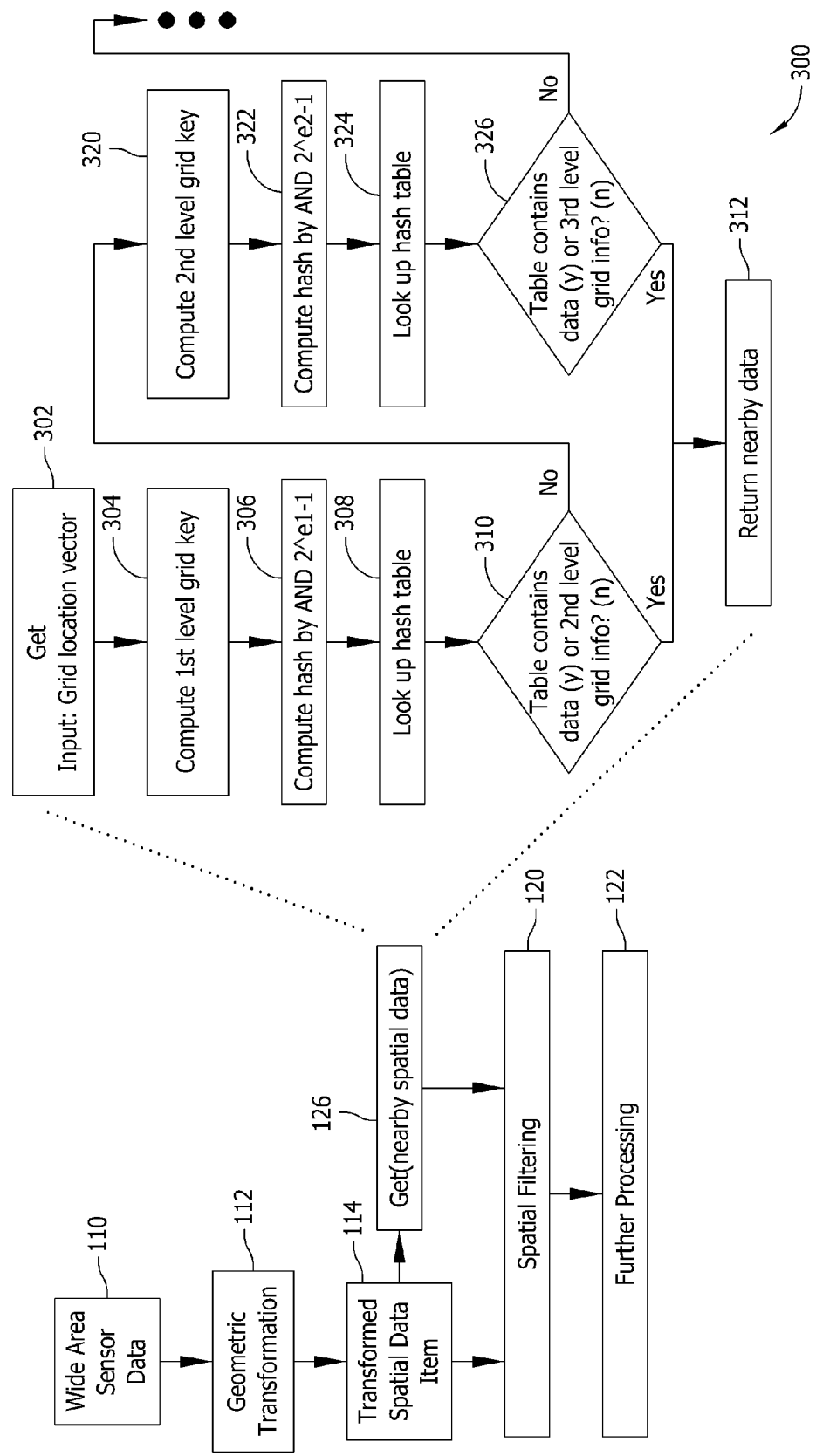
FIG. 3 is a flowchart that illustrates processing of spatial data into a histogram using a hash table within a get operation.

The get operation in a multiple level sparse tree grid array is illustrated by the flowchart 300 of FIG. 3. Similar to the process shown in FIG. 1, frames of sensor data 110 undergo a geometric transformation 112 and the transformed sensor data 114 are applied to the stochastic sparse tree grid spatial filter 120 for further processing 122. Flowchart 300 illustrates the "getting" 126 of nearby spatial data in response to the transformed sensor data 114. Specifically, upon receipt of a grid location vector 302 a first level grid key is computed 304 and a hash value is computed using a chosen exponent 306. A hash table is accessed 308 and if the table contains 310 data, the nearby data is returned 312. If the table instead contains second level grid information a second level grid key is computed 320, the hash is computed using the chosen exponent 322 and a look up into the hash table is performed 324. If the hash table is a multiple level hash table that instead contains 326 third level grid information, the process continues. Otherwise, the nearby data is returned 312.

Figure 4:
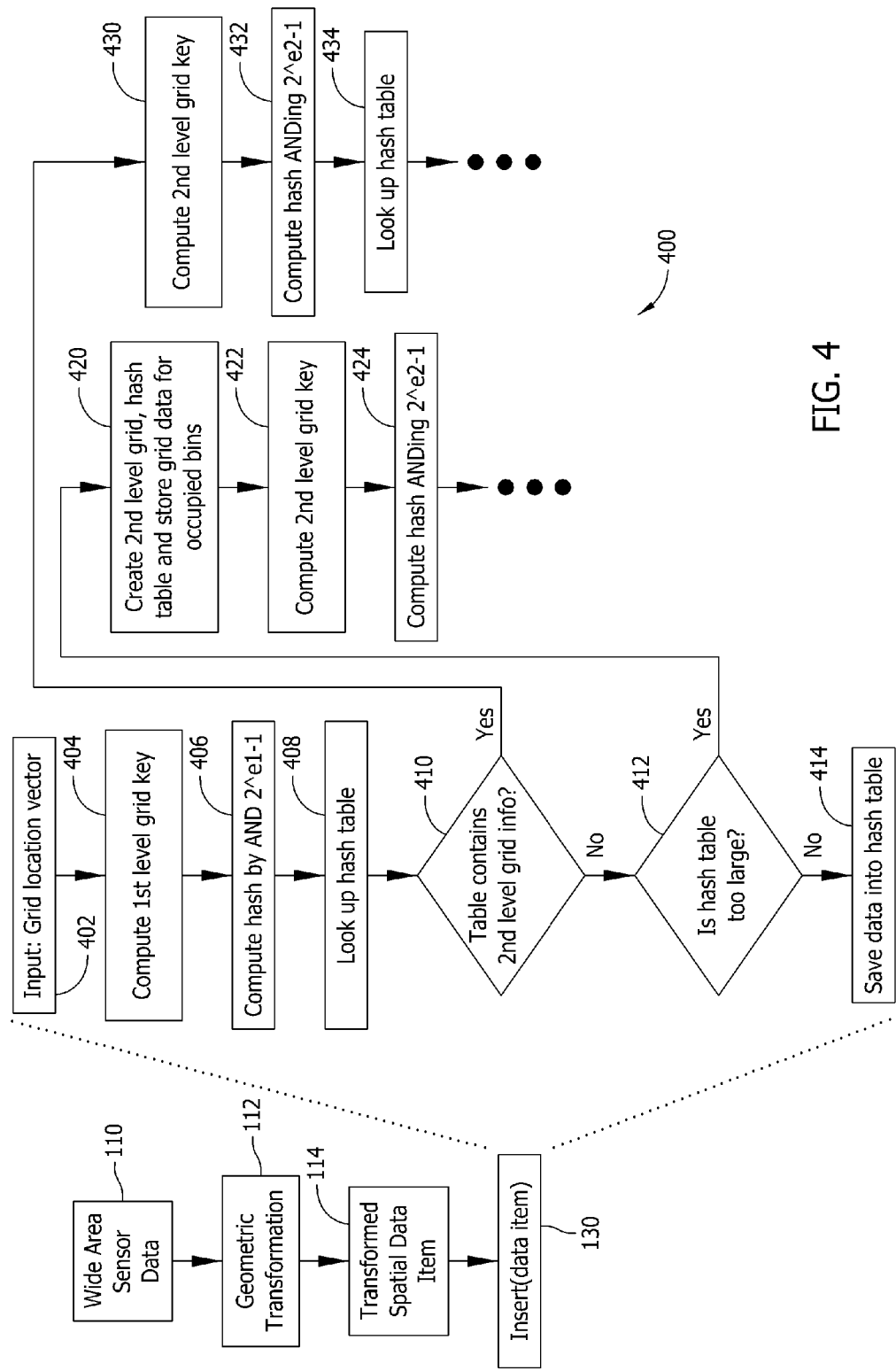
FIG. 4 is a flowchart that illustrates insertion of spatial data into a histogram using a hash table.

The insert operation in a sparse tree grid array is illustrated by the flowchart 400 of FIG. 4. Referring to flowchart 400 of FIG. 4, frames of sensor data 110 undergo a geometric transformation 112 and the transformed sensor data 114 are inserted 130 into the appropriate grid. Flowchart 400 illustrates the "inserting" 130 of data items into the spatial filter. Specifically, upon receipt of a grid location vector 402 a first level grid key is computed 404 and a hash value is computed using the chosen exponent 406. A hash table is accessed 408 and if the hash table does not contain 410 second level grid information or if the hash table is not too large 412, the transformed sensor data is saved 414 into the hash table. If the hash table is too large 412, a second level grid and hash table is created 420 and grid data for occupied bins is stored. A second level grid key is computed 422, and the hash is computed using the chosen exponent 424.

If the hash table contains 410 second level grid information, a second level grid key is computed 430, the hash is computed using the chosen exponent 432 and a look up into the hash table is performed 434.

Figure 5:
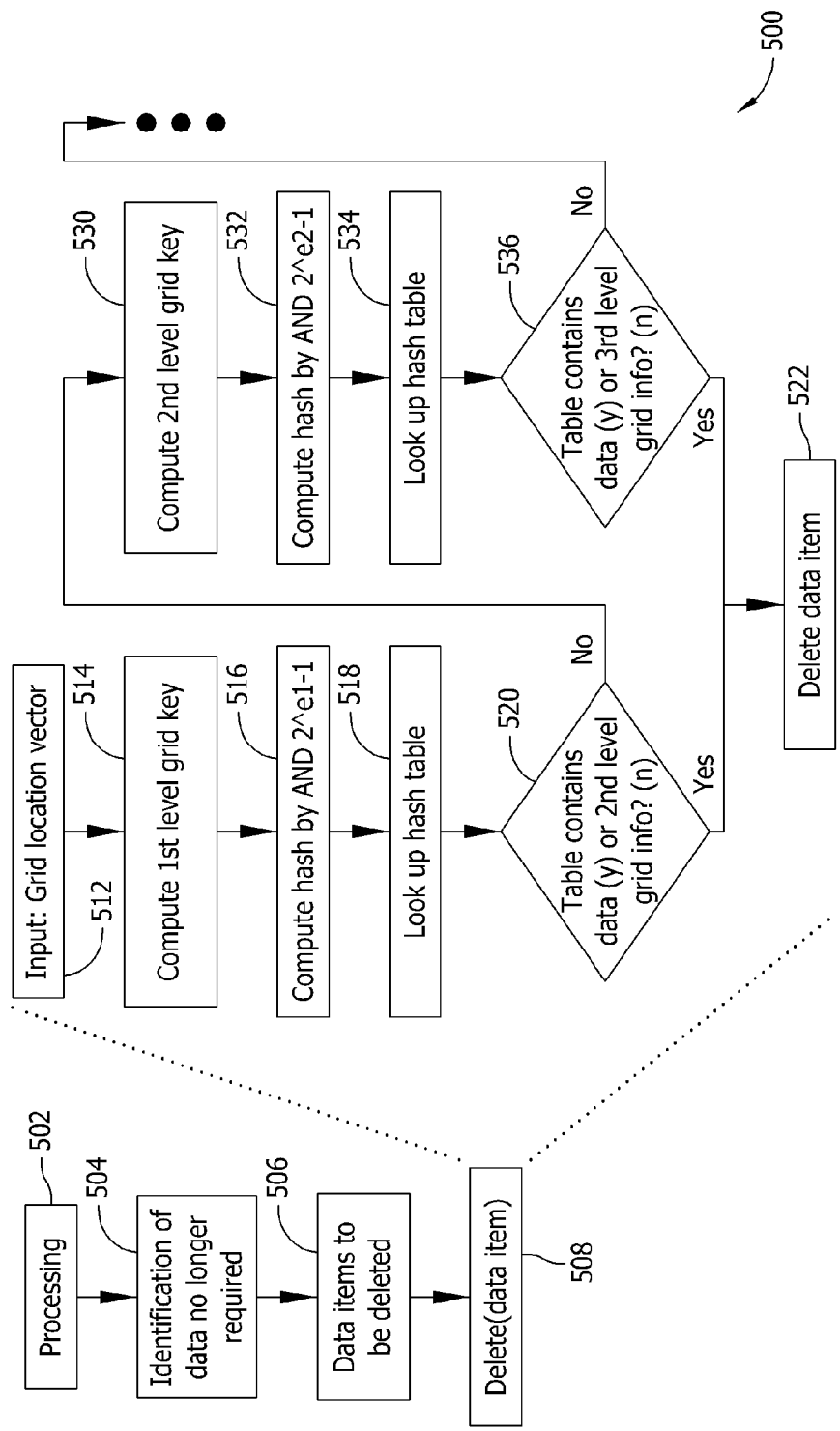
FIG. 5 is a flowchart that illustrates deletion of spatial data from a histogram.

The delete operation in a sparse tree grid array is illustrated by FIG. 5. Referring to FIG. 5, during processing 502 the frames of sensor data that are no longer required are identified 504 resulting in data items to be deleted 506 which are deleted 508 using a deletion process. Flowchart 500 illustrates the "deleting" 508 of data items. Specifically, upon receipt of a grid location vector 512 a first level grid key is computed 514 and a hash value is computed using the chosen exponent 516. A hash table is accessed 518.

If the hash table contains 520 data, the data item is deleted 522. If the hash table instead contains second level grid information, a second level grid key is computed 530, the hash is computed using the chosen exponent 532 and a look up into the hash table is performed 534. If the hash table contains 536 data, the data item is deleted 522, other wise the process continues.

Stochastic Histogram

Figure 6:
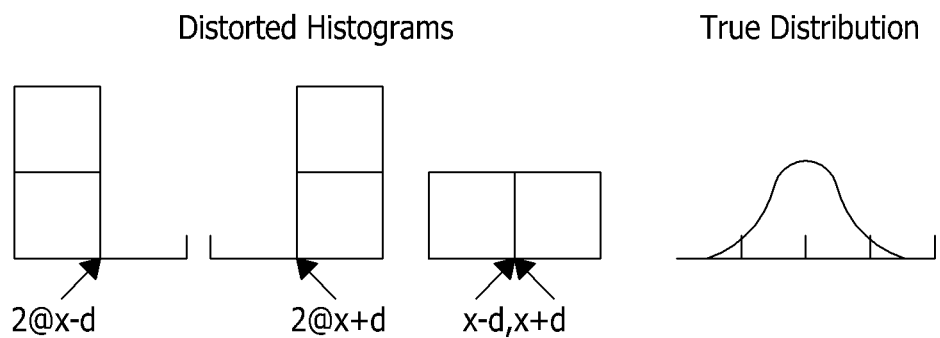
FIG. 6 illustrates several distorted histograms.

Ordinary histograms have discrete bins which data either falls within or does not fall within. This results in a distortion of the appearance of the histogram depending on the bin size and whether the data lands in the center of the bin or near an edge as shown in FIG. 6. Mathematically, the histogram approaches a binned probability density function (pdf) of the data as more and more data is added, provided the bin size is small enough (but not too small). However, this distortion causes the histogram to approach the pdf much more slowly than the approach below and hence requires more data to get good results (more data is probably not available in practice).

Figure 7:
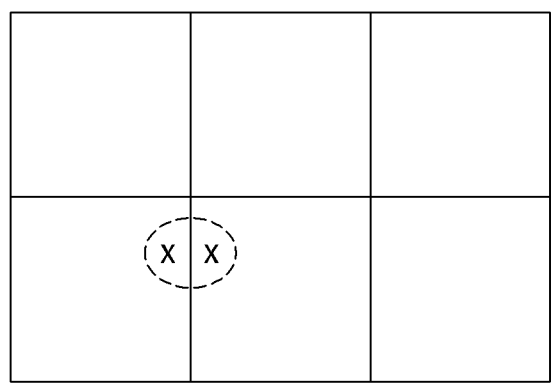
FIG. 7 illustrates that signals which are spatially close may end up in different bins, which is one cause of histogram distortion.

The corresponding problem with using a standard histogram to implement spatial filters is that two signals which are spatially close may end up in different bins, thus appearing to be separated. In fact, their locations just happened to land near the boundary of two location bins as shown in FIG. 7.

Figure 8:
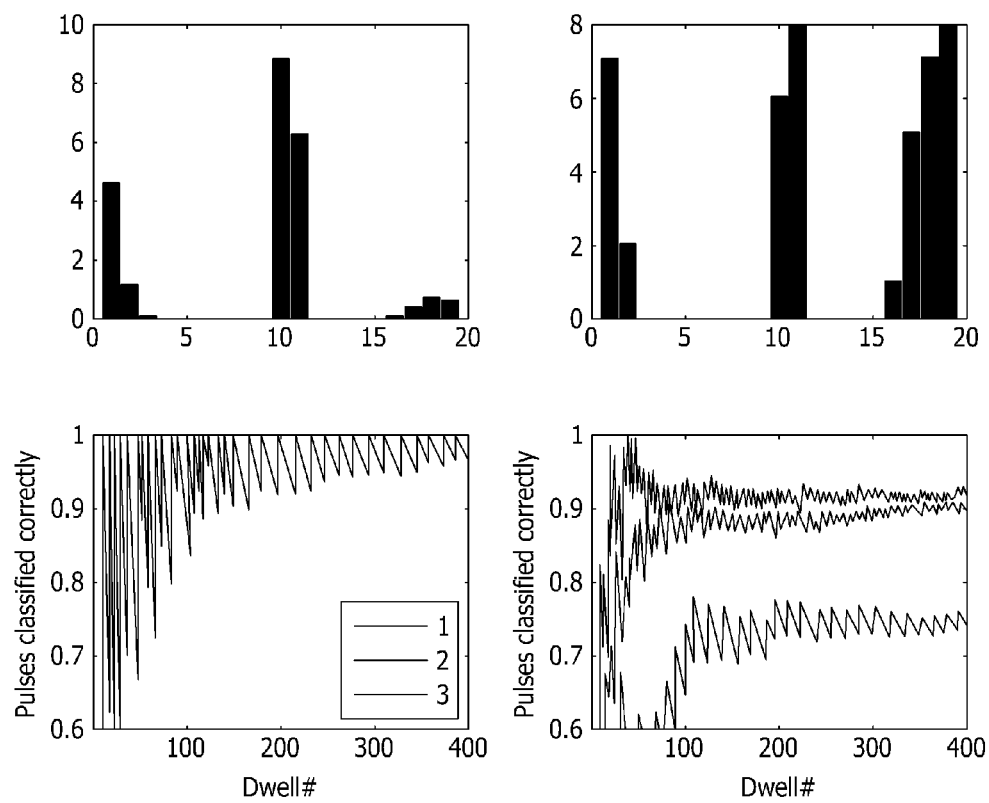
FIG. 8 illustrates comparison results of stochastic histograms versus standard histograms for three pulse sequences.

To solve these problems, the measured or assumed variance of each parameter of the pulse (data item) is used to spread the histogram when each data point is added. Thus instead of only incrementing the bin where a data point falls, nearby bins are incremented as well depending on the spread, allowing each data point to be weighted individually. The distortion effect of the bins is eliminated and the binned histogram is caused to approach the shape of the true pdf much more quickly. The bin size can be set by the standard deviation of the data. Usually the error is assumed to be Gaussian, although any other pdf is handled just as easily. Mathematically, if x is the data with variance $\sigma^2$ and a bin consists of the interval $[b-\Delta b/2, b+\Delta b/2]$, then the value of that bin for a Gaussian histogram becomes:

$$\frac{1}{\sigma\sqrt{2\pi}} \int_{b-\Delta b/2}^{b+\Delta b/2} \exp(-((t-x)/\sigma)^2) \, dt \qquad (1)$$

which can be easily computed by storing a few values of the distribution function and interpolating. The tails of the distribution are of course assumed to be zero and so only a few bins are affected by adding a data point to a Gaussian histogram. Thus the computational load is not increased greatly over a regular histogram. FIG. 8 illustrates the comparison results of using stochastic histograms (left side) versus standard histograms for the case of three pulse sequences with jitter but no extra noise pulses. The classification rate of stochastic histograms does not vary far from perfect results (a result of not having any noise data), while the standard histogram suffers from binning problems.

To generate the details of a stochastic histogram indices to unique values in a sorted list of binned data are found and the differences between the unique points are counted so the bin values in the histogram can be computed. One ordinary histogram function uses a known type of indexing method. A stochastic histogram in its accumulation increments bins based on evaluation (or in a practical implementation, table lookup and interpolation) of the integral in (1).

Sparse Stochastic Histogram with a Priori Information

A (multidimensional) sparse stochastic histogram is used in the situation where most bins have no data. This is certainly the case in an application area where radar returns come from a sparse set of locations across a very large area. Also, the returns are generalized to multiple dimensions, so for example a multidimensional Gaussian sparse stochastic histogram would use a calculation of the form (two dimensions would use k=2):

$$\frac{1}{(2\pi)^{k/2}|\Sigma|^{1/2}} \int_C \exp(-(x-\mu)' \sum\nolimits^{-1} (x-\mu)/2) dx \quad (2)$$

to compute the value stored in a bin b for a measurement μ where C is the rectangular k dimensional region corresponding to a bin centered at b. In particular, with k=2, the bin with center $b_{x,y}$ would use $C=[b_{x,y}-\Delta b_{x,y}/2, b_{x,y}+\Delta b_{x,y}/2]$ corresponding to a bin centered at the vector $b_{x,y}$ with $\Delta b_{x,y}$ its width vector.

The sparse histogram uses the mechanism of the sparse tree grid previously described in its implementation to reduce the memory requirements (only non-zero bins take storage). Again as with the stochastic histogram, even though the Gaussian distribution has an infinitely long tail, in a practical implementation, the calculation in equation (2) would only be done over a fixed range (e.g., plus or minus three standard deviations) with the tails assumed to be zero outside that range, which limits the number of operations to update a sparse stochastic histogram to a constant times the number of input signals.

Another innovation is to add the ability of a stochastic histogram to incorporate a priori information. This is important for many spatial filter problems, since there is often fixed spatial information coming from maps or physical features within space that can influence the spatial filter differently at different locations. For example, land features such as mountains can cause ground clutter and so returns that come from mountainous areas are more likely to be clutter than returns that come from flat desert regions or ocean areas. The equation (2) can easily be accommodated by adding a non-constant weighting or measure to the integration $$\frac{1}{(2\pi)^{k/2}|\Sigma|^{1/2}} \int_C \exp(-(x-\mu)' \sum\nolimits^{-1} (x-\mu)/2) p(x) dx \quad (3)$$

where p(x) is a probability density with ∫p(x)dx=1. In the case of this specific example, (3) computes a bin weighting that is proportional to the probability that clutter is present given a priori land feature information.

Circular Sparse Stochastic Histogram

Mathematically, if x is a circular measurement such as an angle, a bin must also be interpreted modulo 2π or modulo 360° and the modulo interval [b−Δb/2, b+Δb/2] mod 2π becomes the integration range. Thus the value of a (one dimensional) bin for a circular Gaussian histogram becomes $$\frac{1}{\sigma\sqrt{2\pi}} \int_{(b-\Delta b/2) \bmod 2\pi}^{(b+\Delta b/2) \bmod 2\pi} \exp(-((t-x)/\sigma)^2 dt$$

interpreted in the appropriate sense of integrating over a "circular" domain. In general, sparseness of the circular sparse stochastic histogram is treated as above, with a k dimensional stochastic histogram using the following calculation $$\frac{1}{(2\pi)^{k/2}|\Sigma|^{1/2}} \int_{C \bmod 2\pi} \exp(-(x-\mu)' \sum\nolimits^{-1} (x-\mu)/2) p(x) dx.$$

Even more generally, note that for multidimensional circular sparse stochastic histograms, any subset of the dimensions could be circular and the rest non-circular. In particular, a common case is the two dimensional case with measurements of range and azimuth, the first parameter is non-circular, the second is circular. Thus the grid in this case looks topologically like a cylinder.

Figure 9:
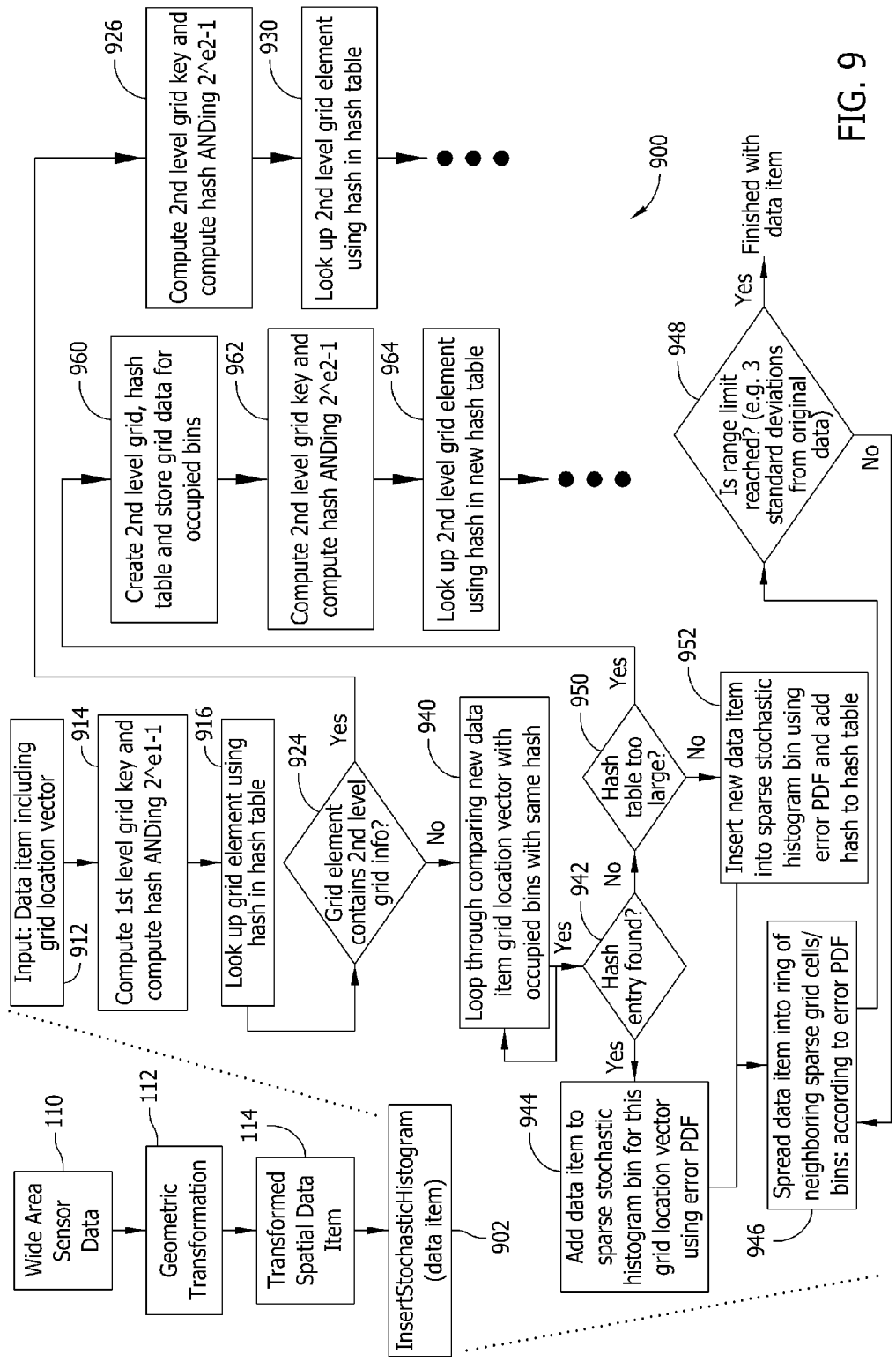
FIG. 9 is a flowchart illustrating insertion of transformed spatial data into a histogram.

FIG. 9 is a flowchart 900 illustrating insertion of transformed sparse spatial data into a stochastic histogram 902. Specifically, frames of wide area sensor data 110 undergo a geometric transformation 112 and the transformed sensor data 114 are inserted into the stochastic histogram 902. Upon receipt of a grid location vector 912 a first level grid key and a hash value are computed 914. A grid element in the hash table is looked up 916 using the computed hash value.

If the hash table contains 924 second level grid information, a second level grid key and hash are computed 926, and a look up into the second level grid element using the hash in the hash table is performed 930. If the hash table does not contain 924 second level grid information, a loop is performed where new data item grid location vectors are compared 940 with occupied bins with the same hash. If a hash entry is found 942, the data item is added 944 to the sparse stochastic histogram bin for this grid location vector using error PDF. The data item is spread 946 into a ring of neighboring sparse grid cells/bins according to an error PDF until a range limit is reached 948.

If no hash entry was found 942, and the hash table is not too large 950, the new data item is inserted 952 into the sparse stochastic histogram bin using error PDF and adding the hash to the hash table. This new data item is spread 946 into a ring of neighboring sparse grid cells/bins according to an error PDF until a range limit is reached 948.

If the hash table is too large 950, a second level grid key and hash table are created 960, and grid data is stored for occupied bins. A second level grid key and hash are computed 962, and a look up into the second level grid element using the hash in the hash table is performed 964.

Sparse Aging Using Time Weighting

Aging using time weighting allows objects within a histogram (stochastic or standard) to age out and disappear. In the context of spatial filter histograms, standard histograms age objects by deleting ones which make up the histogram and which are older than a certain fixed age, i.e. objects with a time value whose difference with the present time is greater than a certain fixed value. This allows unclassified objects to "age out" of the histogram. In particular, noise signals would not ordinarily be tracked and so would remain untracked until ultimately disappearing. This is necessary since otherwise the noise floor on a spatial filter histogram would continue to rise until even strongly accumulating bins of repetitive signals would be swamped by adjacent noise bins. In contrast, by using time weighting, a stochastic histogram keeps linked lists of objects belonging to each "bin" in time order and deaccumulates these signals gradually by using a series of time weights based on a set of time interval ages. Thus the weighting could be exponentially decreasing if desired, or even uniform in other cases, depending on the system requirements.

The innovation described herein uses time weighting in the context of sparse tree grid based stochastic histograms. The difference when having a sparse tree grid is that the old method required evaluating every bin of a standard histogram and deciding whether to keep each signal within that bin. Thus the effort is O(BNR) where B is the number of bins, N is the average number of signals per bin and R is the revisit rate. This could be reduced to $O(B_{nz}NR)$ where $B_{nz}$ is the number of non-zero bins and N is the average number of signals per non-zero bin. But this can be improved further by only evaluating aging when a non-zero bin is accessed via a get, delete or insert operation. Thus the effort to compute aging on sparse grids is only proportional to the number of signals in already existing bins (locations) per time, which is typically much smaller than the previous calculations.

Figure 10:
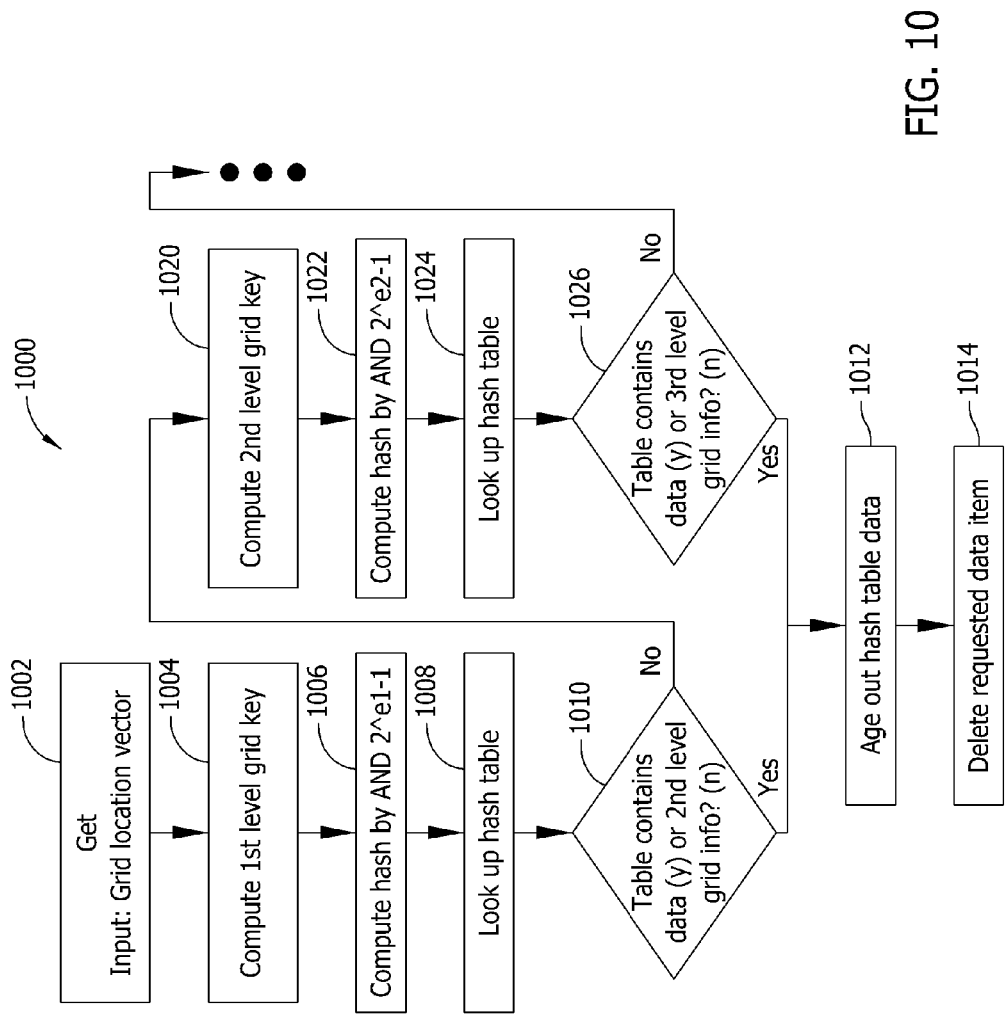
FIG. 10 is a flowchart illustrating aging of hash table data with respect to a get operation.

With regard to sparse aging, a get operation is further illustrated by the flowchart 1000 of FIG. 10. Specifically, upon receipt of a grid location vector 1002 a first level grid key is computed 1004 and a hash value is computed using the chosen exponent 1006. A hash table is accessed 1008 and if the table contains 1010 data, the hash table data is aged 1012 out and the requested data item is deleted 1014. If the table instead contains second level grid information a second level grid key is computed 1020, the hash is computed using the chosen exponent 1022 and a look up into the hash table is performed 1024. If the hash table does not contain 1026 third level grid information, the process continues. Otherwise, the hash table data is aged 1012 out and the requested data item is deleted 1014.

Figure 11:
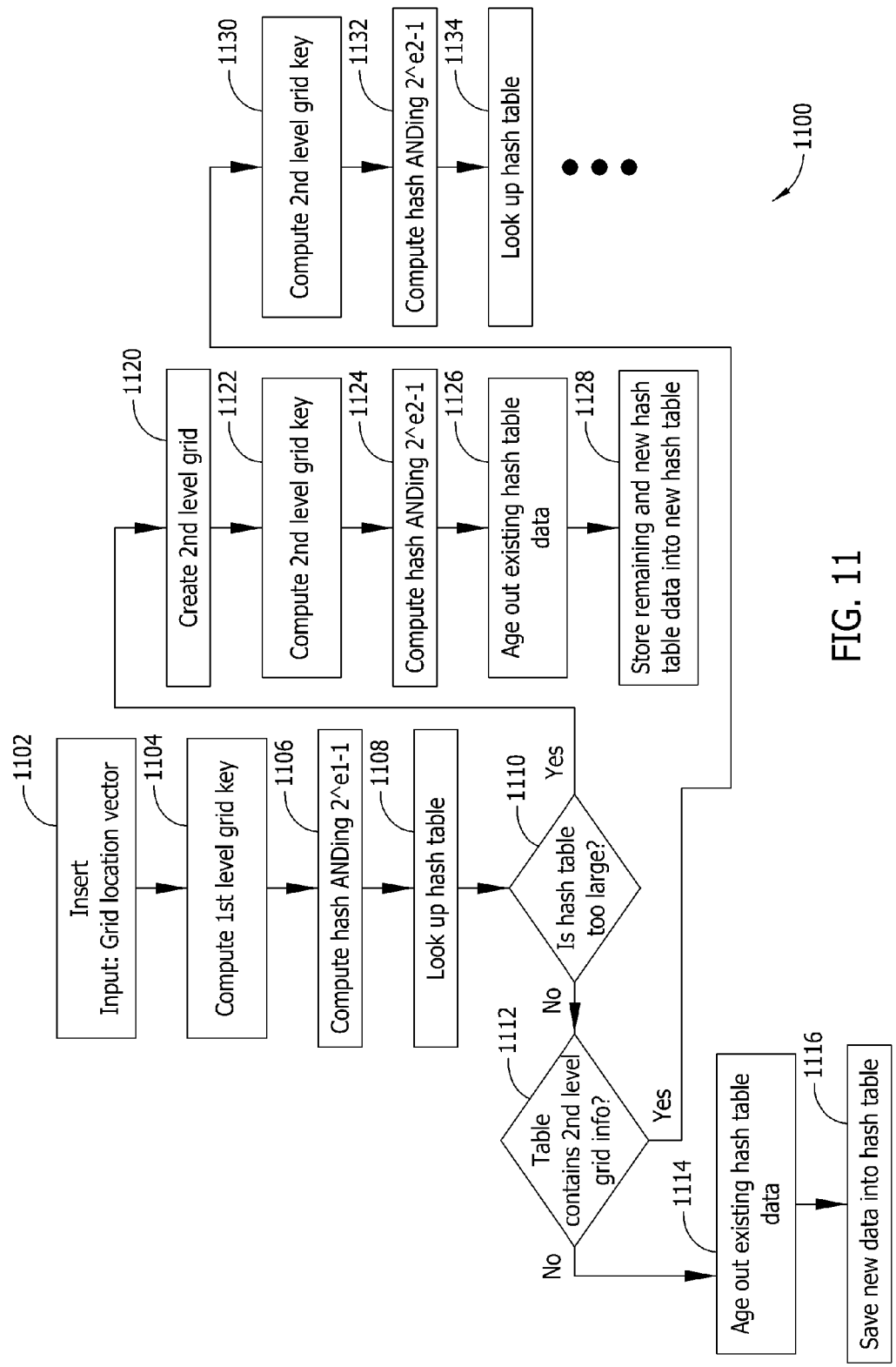
FIG. 11 is a flowchart illustrating aging of hash table data with respect to an insert operation.

Aging with respect to an insertion operation is illustrated by flowchart 1100 of FIG. 11. Specifically, upon receipt of a grid location vector 1102 a first level grid key is computed 1104 and a hash value is computed using the chosen exponent 1106. A hash table is accessed 1108 and if the hash table is not too large 1110 and the hash table does not contain 1112 second level grid information, the existing hash table data is aged out 1114 and new data is saved 1116 into the hash table.

If the hash table is too large 1110, a second level grid is created 1120, a second level grid key is computed 1122, the hash is computed using the chosen exponent 1124 and existing hash table data are aged out 1126. Remaining hash table data and new hash table data are stored 1128 into a new hash table.

If the hash table contains 1112 second level grid information, a second level grid key is computed 1130, the hash is computed using the chosen exponent 1132 and a look up into the hash table is performed 1134 and processing continues as with the first level grid.

Figure 12:
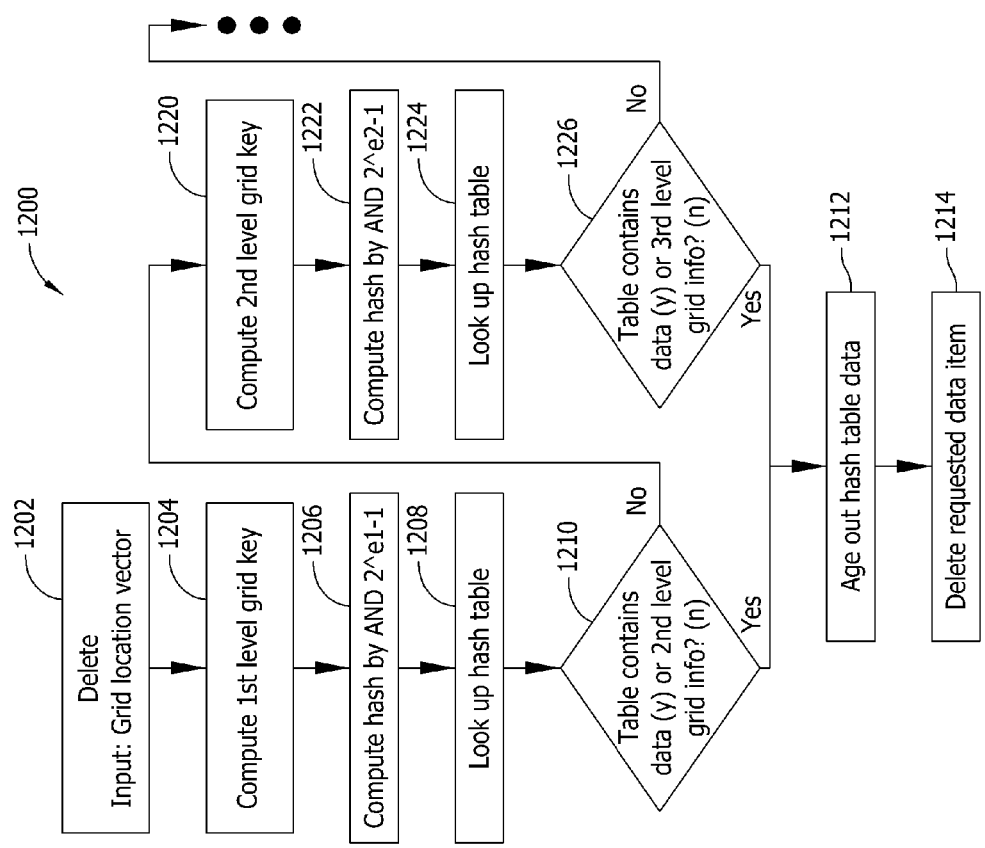
FIG. 12 is a flowchart illustrating aging of hash table data with respect to a delete operation.

Aging with respect to a delete operation is illustrated by flowchart 1200 of FIG. 12. Specifically, upon receipt of a grid location vector 1202 a first level grid key is computed 1204 and a hash value is computed using the chosen exponent 1206. A hash table is accessed 1208.

If the hash table contains 1210 data, the hash table data is aged out 1212 and the requested data item is deleted 1214. If the hash table instead contains second level grid information, a second level grid key is computed 1220, the hash is computed using the chosen exponent 1222 and a look up into the hash table is performed 1224. If the hash table contains 1226 data, the hash table data is aged out 1212 and the requested data item is deleted 1214. Other wise the process continues.

Application to Radar Clutter Filter

Clutter elimination is one of the main functions of radar data processing for Doppler radars. These radars bounce signals off of objects over a large field of view and measure when the pulses return along with how much induced Doppler is present. This is used to paint a picture of the environment. For example, navigation/collision avoidance radar is used to help commercial aircraft avoid other aircraft.

Clutter consists of unwanted returns from objects on the ground. If these are not filtered out, they would overwhelm the processing system which can only handle a limited number of returns. The next section describes a typical pulse Doppler radar signal.

Pulse Doppler Radar Introduction

A standard pulse Doppler radar signal would consist of short pulses (pulse duration τ) with a single tone f equally spaced in time (the pulse repetition interval PRI) and receive reflected pulses after a range dependent delay with an induced Doppler due to the velocity different between the transmitter and receiver. Note that a PRI T corresponds to a pulse repetition frequency (PRF) of 1/T. To improve range resolution, even shorter pulses could be sent, but this would decrease the average power on target. What is desired is to increase the pulse width, but still achieve adequate range resolution. This is what pulse compression does, adding a modulation to the basic radar pulse.

Typical examples of pulse compression modulation include the Barker sequence and other related binary sequences. However, since bi-phase codes have poor Doppler tolerance, typically poly-phase codes are used. There are several families including the P series and the Frank codes. In order to decrease ambiguities caused by not knowing how to associate transmitted pulses to received pulses, the other thing that modern Doppler radars do is use staggered and multiple PRFs. The purpose of staggered PRF (related approaches are jittered PRF where the pulse timing is varied in a pseudo-random manner and pulse-frequency modulation and other similar techniques) is to reduce the probability of unintentional synchronicity between the returns and the range bins. The purpose of multiple PRFs is to allow unambiguous range resolution across a much larger interval than single PRFs without increasing the PRI too much.

Thus a general pulse doppler radar system uses P multiple PRF's, for example, {PRF1, PRF2, . . . , PRFp}, each with Q staggers $\{S_{1i}, S_{2i}, \ldots, S_{Qi}\}$ mod $PRI_i$ and each pulse $\mu_\tau(t)$ is modulated by a function g(t) which may consist of a biphase or polyphase sequence for pulse compression $$\Re\left\{\sum_{ijk} g(t)\exp(2\pi f_c(t - s_{ijk})\mu_\tau(t)\right\}$$

where $s_{ijk}=kPRI_i+S_{ij}$. The pulse parameters consist of the staggers, PRFs, pulse width τ, center frequency $f_c$, and modulation function g(t). The radar then processes these bounced return signals to derive what objects are within range and where they are going.

When ground or clutter returns are received, they would ordinarily fall into a velocity bin corresponding to the ground speed and be filtered out by radar processing. However, returns from mountains, buildings or other physical features, especially outside the main velocity vector of the radar bearing aircraft, come in at a Doppler that does not correspond to the aircraft velocity and so are not filtered out. What is required is a methodology to decide which pulse returns are nevertheless ground clutter and can be safely removed from further processing. The methodology is the spatial filter radar clutter application described herein.

Mapping and Labeling Radar Reports

Knowing the specifics of the pulses that were sent, and after processing the radar returns, each radar pulse return is tagged by delay and Doppler (and azimuth quite often or even a 2D direction vector for phased array radars). This information provides spatial information attached to each pulse after suitable processing to remove the radar's own velocity. This information may be in the form (range, azimuth), (latitude, longitude) or even a 3D (x, y, z) point. These returns in the form of objects with the parameters mentioned in the previous section would be inserted into the sparse stochastic tree grid in the bin corresponding to the location information with the appropriate spreading using a stochastic bin calculation as previously described.

The key is that when a return is inserted into the tree grid, it can be labeled based on the bin it is going into. This is the essence of the spatial filter function. This labeling can be done using all the information available from the grid and previous returns. For example, a simple metric (called a clutter metric) is to tag each return with the height of the bin it goes into, weighted by the a priori ground feature information coming from predefined maps. This then provides a direct measure of the probability that the pulse is a clutter return, because that is directly measured by the stochastic histogram as in equation (3).

Another metric (called a multipath metric) can be computed based on the occupancy of this grid element which evaluates how close this return is to all the other ones in the same bin. All grid elements that are close are then labeled with the multipath metric. This "closeness" metric is then used to detect multipath as opposed to clutter. The labeling process instantly identifies clutter and multipath through the mechanism of the stochastic spatial filter. Because the aging of data within the grid is operating continuously, this allows the spatial filter to adapt or learn as clutter and multipath conditions change.

Similarly, the tracking can also be integrated with the spatial filter defined above. It requires a simple decision algorithm that incorporates the labeling of the reports from the spatial filter. One method would be to pick thresholds and any radar returns that have a clutter or multipath metric above a threshold would be declared clutter or multipath and would not be tracked. But a simple algorithm like this would break tracks near clutter centers and even multipath (which can cause multiple close reports that look like temporary clutter) occurs. Thus the following situations could occur: well-defined tracks crossing map clutter regions could be broken if the reports are declared to be clutter, even if no actual clutter returns occur; well defined tracks could suddenly break because of temporary multipath returns from the target. A better solution would try and handle the multipath (extra returns that cause ambiguities in the tracking) and continue updating the track.

To address these problems, a better approach is disclosed herein that operates as follows. Since the tracker has knowledge of all existing tracks: an existing track entering a map clutter region could ignore the clutter metric for all returns that are near the predicted track location. This would keep a track update alive for an extended period of time. This state of "ignoring the clutter metric" could age out so that if enough time passes, those returns are again labeled as clutter and the track becomes broken. If a set of returns is labeled as multipath, the entire set could be synthesized into a single return with an estimated "true" return time and Doppler. This state of "return synthesis" could also age out so that if enough time passes, those returns are again considered individually and labeled as multipath and the track would become broken.

The described embodiments provide a method for creating spatial filters using a stochastic sparse tree grid. In embodiments, a method is provided which describes the use of a stochastic sparse tree grid as a spatial filter which enhances detection and classification performance by decreasing the required detection and classification signal to noise ratio through better filtering based on signal location. In particular, better detection and elimination of multipath is provided as well as better detection and elimination of clutter returns. Better detection implies smaller antennas for the same performance of previous methods, better performance with existing antennas than with previous methods, detection and classification of lower power signals, and detection and classification of signals with lower false alarm rates than previous methods.

An implementation of a sparse grid is described that uses hash keys to create enormous grid sizes without using exorbitant amounts of memory and with a very small number of operations per insert/delete/get. In particular, the hash method described herein avoids the use of integer division (modulo operations) and uses instead a simple bit mask.

An enhanced version of the stochastic histogram called the (multidimensional) sparse stochastic histogram is described that allows spatial filtering on extremely large gridded areas. A specific version of the sparse stochastic histogram called a circular sparse stochastic histogram is described that allows spatial filtering on circular parameters such as azimuth, phase difference of arrival (PDOA) or longitude. Finally, an algorithm structure is described that allows a multi-resolution tree of sparse grids to store and process sparse grids at different levels of resolution depending on the physical distribution of received signals. This allows more efficient processing by allowing sparse regions to use coarser grids and denser regions to use finer grids.

Figure 13:
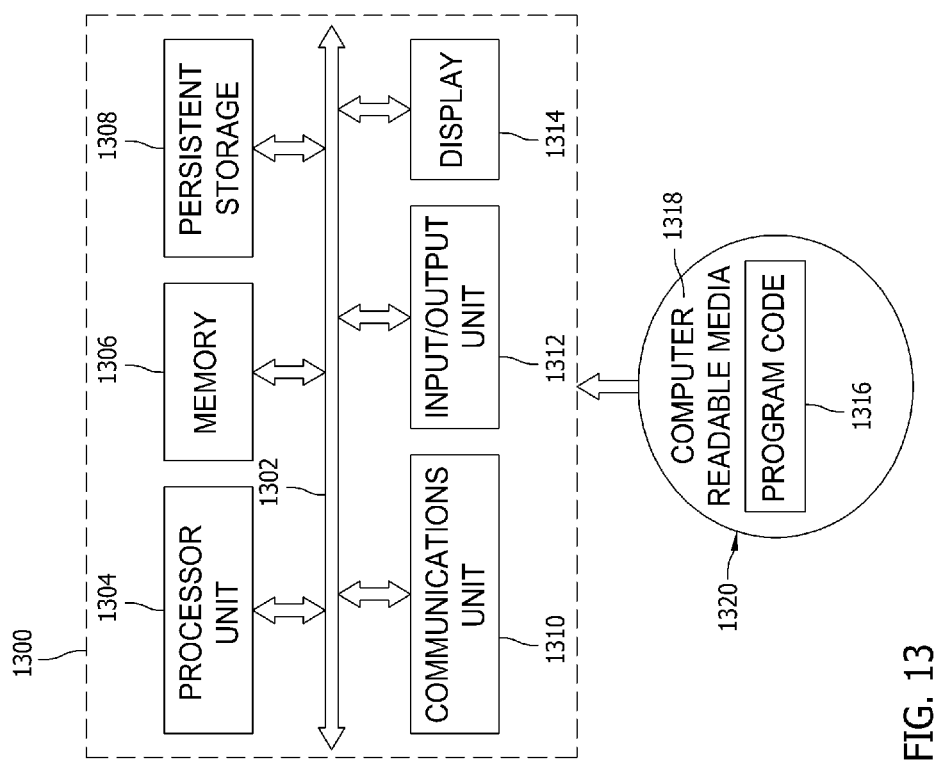
FIG. 13 is a diagram of a data processing system.

Turning now to FIG. 13, a diagram of a data processing system upon which the described filter and filtering method may be implemented is depicted in accordance with an illustrative embodiment. In this illustrative example, data processing system 1300 includes communications fabric 1302, which provides communications between processor unit 1304, memory 1306, persistent storage 1308, communications unit 1310, input/output (I/O) unit 1312, and display 1314.

Processor unit 1304 serves to execute instructions for software that may be loaded into memory 1306. Processor unit 1304 may be a set of one or more processors or may be a multi-processor core, depending on the particular implementation. Further, processor unit 1304 may be implemented using one or more heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices. A storage device is any piece of hardware that is capable of storing information either on a temporary basis and/or a permanent basis. Memory 1306, in these examples, may be, for example, without limitation, a random access memory or any other suitable volatile or non-volatile storage device. Persistent storage 1308 may take various forms depending on the particular implementation. For example, without limitation, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, without limitation, a removable hard drive may be used for persistent storage 1308.

Communications unit 1310, in these examples, provides for communications with other data processing systems or devices. In these examples, communications unit 1310 is a network interface card. Communications unit 1310 may provide communications through the use of either or both physical and wireless communication links.

Input/output unit 1312 allows for input and output of data with other devices that may be connected to data processing system 1300. For example, without limitation, input/output unit 1312 may provide a connection for user input through a keyboard and mouse. Further, input/output unit 1312 may send output to a printer. Display 1314 provides a mechanism to display information to a user.

Instructions for the operating system and applications or programs are located on persistent storage 1308. These instructions may be loaded into memory 1306 for execution by processor unit 1304. The processes of the different embodiments may be performed by processor unit 1304 using computer implemented instructions, which may be located in a memory, such as memory 1306. These instructions are referred to as program code, computer usable program code, or computer readable program code that may be read and executed by a processor in processor unit 1304. The program code in the different embodiments may be embodied on different physical or tangible computer readable media, such as memory 1306 or persistent storage 1308.

Program code 1316 is located in a functional form on computer readable media 1318 that is selectively removable and may be loaded onto or transferred to data processing system 1300 for execution by processor unit 1304. Program code 1316 and computer readable media 1318 form computer program product 1320 in these examples. In one example, computer readable media 1318 may be in a tangible form, such as, for example, an optical or magnetic disc that is inserted or placed into a drive or other device that is part of persistent storage 1308 for transfer onto a storage device, such as a hard drive that is part of persistent storage 1308. In a tangible form, computer readable media 1318 also may take the form of a persistent storage, such as a hard drive, a thumb drive, or a flash memory that is connected to data processing system 1300. The tangible form of computer readable media 1318 is also referred to as computer recordable storage media. In some instances, computer readable media 1318 may not be removable.

Alternatively, program code 1316 may be transferred to data processing system 1300 from computer readable media 1318 through a communications link to communications unit 1310 and/or through a connection to input/output unit 1312. The communications link and/or the connection may be physical or wireless in the illustrative examples. The computer readable media also may take the form of non-tangible media, such as communications links or wireless transmissions containing the program code.

In some illustrative embodiments, program code 1316 may be downloaded over a network to persistent storage 1308 from another device or data processing system for use within data processing system 1300. For instance, program code stored in a computer readable storage medium in a server data processing system may be downloaded over a network from the server to data processing system 1300. The data processing system providing program code 1316 may be a server computer, a client computer, or some other device capable of storing and transmitting program code 1316.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown.

As one example, a storage device in data processing system 1300 is any hardware apparatus that may store data. Memory 1306, persistent storage 1308 and computer readable media 1318 are examples of storage devices in a tangible form.

In another example, a bus system may be used to implement communications fabric 1302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 1306 or a cache such as that found in an interface and memory controller hub that may be present in communications fabric 1302.

In the above described embodiments, methods are provided for creating spatial filters for radar signals over wide areas using a stochastic sparse tree grid. This method uses a stochastic sparse tree grid as a spatial filter to enhance detection and classification performance of radar signals by decreasing the required detection and classification signal to noise ratio through better filtering based on signal location. In particular, better detection and elimination of multipath is provided as well as better detection and elimination of clutter returns. Better detection implies smaller antennas for the same performance of previous methods, better performance with existing antennas than with previous methods, detection and classification of lower power signals, and detection and classification of signals with lower false alarm rates than previous methods. As described herein, exemplary embodiments include mapping spatial sensor input into a multi-level sparse stochastic tree grid, handling of a priori spatial information by embedding this information in the stochastic spatial processing of each grid element, efficiently implementing stochastic histograms within the sparse tree grids, and efficiently accessing these grid elements through a multiple level hash structure.

In additional advantageous embodiments, a method is provided for creating spatial filters for image and video sensors covering wide areas using a stochastic sparse tree grid. This method uses a stochastic sparse tree grid as a spatial filter to enhance detection and classification performance of objects within images and video by doing better image filtering based on object location. Better detection implies better resolution from imaging sensors of a given size as well as detection and classification of objects with lower false alarm rates than previous methods.

Use of a stochastic sparse tree grid as a spatial filter enhances detection and classification performance by decreasing the required detection and classification signal to noise ratio through better filtering based on signal location.

An implementation of a sparse grid is also described that uses hash keys to create enormous grid sizes without using exorbitant amounts of memory and with a very small number of operations per insert/delete/get. In particular, the described hash method avoids the use of integer division (modulo operations) and uses instead a simple bit mask.

An enhanced version of the stochastic histogram called the (multidimensional) sparse stochastic histogram is also described that allows spatial filtering on extremely large gridded areas. A specific version of the sparse stochastic histogram, a circular sparse stochastic histogram, is described that allows spatial filtering on circular parameters such as azimuth, phase difference of arrival (PDOA) or longitude. Finally, an algorithm structure is described that allows a multiresolution tree of sparse grids to store and process sparse grids at different levels of resolution depending on the physical distribution of received signals. The described processing and storing allows more efficient processing by allowing sparse regions to use coarser grids and denser regions to use finer grids.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for processing data, said method comprising:
   receiving, at a processing device, data to be processed;
   processing the data to assign spatial information to the data, the spatial information defining an element on a grid;
   determining, with the processing device, a sparseness of the processed data through application of the processed data to a multiple resolution level sparse tree filter, wherein the multiple resolution level sparse tree filter includes multiple resolution levels with different grids within each level;
   placing the processed data within a histogram based on the determined sparseness; and
   filtering the data based on spatial statistics using a sparse histogram method.

2. The computer-based method according to claim 1 wherein determining a sparseness of the processed data comprises:
   accessing the multiple resolution level sparse tree filter based on a hash key within a hash table; and
   determining if an address in a memory associated with the hash key includes a list of hash keys associated with the address or a pointer to another hash table.

3. The computer-based method according to claim 2 further comprising:
   sizing each hash key to be a power of two; and
   ANDing the hash key with a bit mask that masks higher order bits.

4. The computer-based method according to claim 2 further comprising adding an additional resolution level to the multiple resolution level sparse tree filter based on a number of hash keys for a filter level.

5. The computer-based method according to claim 1 wherein determining a sparseness of the processed data through application of the processed data comprises at least one of embedding spatial information in stochastic processing of each sparse tree filter element and spatial filtering on circular parameters including one or more of azimuth, phase difference of arrival, and longitude.

6. The computer-based method according to claim 1 wherein processing the data to assign spatial information to the data comprises mapping spatial sensor input into the multiple resolution level sparse tree grid.

7. The computer-based method according to claim 1 further comprising:
   storing non-zero elements of the multiple resolution level sparse tree grid using a hash table;
   wherein the number of levels and grids in the multiple resolution sparse tree filter are based on a sparseness of the data within a spatial region associated with a grid; and
   wherein the multiple level sparse tree filter comprises a coarsest grid configured to be accessed first and a finest grid configured to be accessed last.

8. The computer-based method according to claim 1 wherein placing the processed data within a histogram comprises:
   incrementing a bin where the processed data is to be placed; and
   incrementing bins proximate the incremented bin to eliminate a distortion effect of the bins.

9. The computer-based method according to claim 1 further comprising aging out data from the histogram based on an aging evaluation when a non-zero bin is accessed.

10. The computer-based method according to claim 1 wherein determining a sparseness of the data comprises filtering based on signal location to enhance detection and classification performance by decreasing a required detection and a classification signal to noise ratio.

11. A system for filtering of data, said system comprising:
    a plurality of sensors configured to generate data representative of a physical spatial domain;
    a memory for storing the data; and
    a processor coupled to said memory and said sensors, wherein said processor is programmed to:
    receive the data from the physical spatial domain;
    process the data to assign spatial information to the data, the spatial information defining an element on a grid;
    determine a sparseness of the processed data through application of the processed data to a multiple level, stochastic sparse tree grid spatial filter, wherein the multiple level sparse tree grid spatial filter includes multiple resolution levels with different grids within each level;
    place the processed data within a histogram based on the determined sparseness; and
    filter the data based on spatial statistics using a sparse histogram method.

12. The system according to claim 11 wherein to process the data, said processor is programmed to:
    embed a priori spatial information in stochastic processing of each grid element; and
    map the stochastic sparse tree grid spatial filter to implement a clutter filter based on a-priori and a-posteriori information.

13. The system according to claim 11 wherein to process the data, said processor is programmed to filter radar return data with spatial content to remove noise and interference.

14. The system according to claim 11 wherein said sensors are operable to receive at least one of radar returns from a synthetic aperture radar (SAR), an image formed from radar returns, a collection of Doppler radar returns across a physical extent, and a visible image or video of a region.

15. The system according to claim 11 wherein to process the data, said processor is programmed to transform pixels of said sensors into a grid representing spatial content fixed with reference to the earth.

16. The system according to claim 11 wherein said processor is programmed to implement hash key indexing into the sparse tree grid spatial filter.

17. The system according to claim 11 wherein to determine sparseness of the processed data through application of the processed radar return data to a stochastic sparse tree grid spatial filter, said processor is programmed to:
    implement a series of grids arranged in a multi-resolution fashion where a coarsest grid is first to be accessed and a finest grid is last to be accessed; and
    compute a hash h(k) for accessing each of the grids.

18. The system according to claim 17 wherein to implement a series of grids arranged in a multi-resolution fashion, said processor is programmed to implement multiple different resolution grid portions per grid level, each grid portion supporting a denser spatial region than the grid portion implemented above, each grid level portion accessible using a hash key.

19. The system according to claim 18 wherein said processor is programmed to configure a multiple level hash table to have a number of rows and a number of columns which allows a size of each hash key to be a power of two and reduces hash computations to a bit AND operation.

20. One or more computer-readable storage media having computer-executable instructions embodied thereon, wherein when executed by at least one processor, the computer-executable instructions cause the at least one processor to:
- receive data from a physical spatial domain;
- process the data to assign spatial information to the data, the spatial information defining an element on a grid;
- determine a sparseness of the processed data through application of the processed data to a multiple level stochastic sparse tree grid spatial filter, wherein the multiple level sparse tree grid spatial filter includes multiple resolution levels with different grids within each level;
- place the processed data within a histogram based on the determined sparseness; and
- filter the data based on spatial statistics using a sparse histogram method.

* * * * *